(12) United States Patent
Shimogawa

(10) Patent No.: US 9,069,623 B2
(45) Date of Patent: Jun. 30, 2015

(54) MANAGEMENT APPARATUS, METHOD, AND PRIVILEGED AND CONFIDENTIAL MEDIUM STORING PROGRAM TO MIGRATE A VIRTUAL MACHINE WHEN A RESOURCE SHORTAGE OR BOOTING OCCURS

(75) Inventor: Kenichirou Shimogawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 339 days.

(21) Appl. No.: 13/047,254

(22) Filed: Mar. 14, 2011

(65) Prior Publication Data

US 2011/0231843 A1 Sep. 22, 2011

(30) Foreign Application Priority Data

Mar. 18, 2010 (JP) .................................. 2010-61849

(51) Int. Cl.
G06F 9/455 (2006.01)
G06F 9/46 (2006.01)
G06F 9/50 (2006.01)

(52) U.S. Cl.
CPC ........ G06F 9/5088 (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 7,730,486 B2 * | 6/2010 | Herington | 718/1 |
| 8,387,060 B2 * | 2/2013 | Pirzada et al. | 718/104 |
| 2003/0097393 A1 | 5/2003 | Kawamoto et al. | |
| 2005/0172040 A1 | 8/2005 | Hashimoto | |
| 2006/0069761 A1 * | 3/2006 | Singh et al. | 709/222 |
| 2007/0130566 A1 * | 6/2007 | van Rietschote et al. | 718/1 |
| 2008/0184229 A1 * | 7/2008 | Rosu et al. | 718/1 |
| 2008/0222633 A1 * | 9/2008 | Kami | 718/1 |
| 2008/0295096 A1 * | 11/2008 | Beaty et al. | 718/1 |
| 2009/0070771 A1 * | 3/2009 | Yuyitung et al. | 718/105 |
| 2010/0005465 A1 * | 1/2010 | Kawato | 718/1 |
| 2010/0125845 A1 * | 5/2010 | Sugumar et al. | 718/1 |
| 2010/0175070 A1 | 7/2010 | Baba | |
| 2010/0269109 A1 * | 10/2010 | Cartales | 718/1 |
| 2010/0306381 A1 * | 12/2010 | Lublin et al. | 709/226 |
| 2011/0047541 A1 * | 2/2011 | Yamaguchi et al. | 718/1 |

FOREIGN PATENT DOCUMENTS

| | | |
|---|---|---|
| JP | 2003-157177 | 5/2003 |
| JP | 2005-222123 | 8/2005 |
| JP | 2009-259049 | 11/2009 |
| WO | WO 2008/062864 | 5/2008 |
| WO | WO 2008/146677 | 12/2008 |

\* cited by examiner

*Primary Examiner* — Tammy Lee
(74) *Attorney, Agent, or Firm* — Staas & Halsey LLP

(57) ABSTRACT

An apparatus includes: a first requesting unit, when a resource shortage or booting of a virtual machine occurs in a first server apparatus of the server apparatus, requesting each of the other server apparatuses to report a resource usage rate to obtain one or more resource usage rates, a selection unit selecting a second server apparatus having a surplus resource from the other server apparatuses on the basis of the obtained one or more resource usage rates, and a second requesting unit requesting the first server apparatus to perform a live migration to migrate a virtual machine running on the first server apparatus to the second server apparatus.

13 Claims, 19 Drawing Sheets

FIG. 3

| SERVER APPARATUS NAME | CPU POWER (GHz) | MEMORY SIZE (GB) | HOST-BUS ADAPTER CAPACITY (GB/S) | NETWORK CAPACITY (Gb/S) |
|---|---|---|---|---|
| SERVER1 | 40 | 64 | 0.8 | 8 |
| SERVER2 | 32 | 32 | 1.2 | 16 |
| SERVER3 | 60 | 128 | 1.6 | 24 |
| SERVER4 | 24 | 24 | 0.6 | 4 |

40

| ITEM | VALUE |
|---|---|
| CPU POWER (GHz) | 40 |
| MEMORY SIZE (GB) | 64 |
| HOST-BUS ADAPTER CAPACITY (GB/S) | 0.8 |
| NETWORK CAPACITY (Gb/S) | 8 |

| ITEM | USAGE RATE (%) |
|---|---|
| CPU | 50 |
| MEMORY | 30 |
| HOST-BUS ADAPTER | 80 |
| NETWORK | 60 |

| OS NAME | CPU USAGE RATE (%) | MEMORY USAGE RATE (%) | HOST-BUS ADAPTER USAGE RATE (%) | NETWORK USAGE RATE (%) |
|---|---|---|---|---|
| HOST | 80 | 60 | 60 | 100 |
| GUEST1 | 30 | 20 | 20 | 50 |
| GUEST2 | 10 | 15 | 15 | 10 |
| GUEST3 | 25 | 20 | 15 | 30 |
| GUEST4 | 15 | 5 | 10 | 20 |

FIG. 16A

SERVER1

| ITEM | USAGE RATE (%) |
|---|---|
| CPU | 50 |
| MEMORY | 82 |
| HOST-BUS ADAPTER | 88 |
| NETWORK | 38 |

FIG. 16B

SERVER2

| ITEM | USAGE RATE (%) |
|---|---|
| CPU | 25 |
| MEMORY | 69 |
| HOST-BUS ADAPTER | 67 |
| NETWORK | 88 |

FIG. 16C

SERVER3

| ITEM | USAGE RATE (%) |
|---|---|
| CPU | 60 |
| MEMORY | 88 |
| HOST-BUS ADAPTER | 63 |
| NETWORK | 83 |

FIG. 16D

SERVER4

| ITEM | USAGE RATE (%) |
|---|---|
| CPU | 33 |
| MEMORY | 92 |
| HOST-BUS ADAPTER | 33 |
| NETWORK | 75 |

FIG. 17

| SERVER APPARATUS NAME | CPU POWER (GHz) | MEMORY SIZE (GB) | HOST-BUS ADAPTER CAPACITY (GB/S) | NETWORK CAPACITY (Gb/S) |
|---|---|---|---|---|
| SERVER1 | 20 | 12 | 0.1 | 5 |
| SERVER2 | 24 | 10 | 0.4 | 2 |
| SERVER3 | 24 | 16 | 0.6 | 4 |
| SERVER4 | 16 | 2 | 0.4 | 1 |

FIG. 18A

SERVER2

| ITEM | USAGE RATE (%) |
|---|---|
| CPU | 25 |
| MEMORY | 56 |
| HOST-BUS ADAPTER | 67 |
| NETWORK | 88 |

SERVER3

| ITEM | USAGE RATE (%) |
|---|---|
| CPU | 60 |
| MEMORY | 88 |
| HOST-BUS ADAPTER | 62 |
| NETWORK | 79 |

SERVER4

| ITEM | USAGE RATE (%) |
|---|---|
| CPU | 33 |
| MEMORY | 92 |
| HOST-BUS ADAPTER | 33 |
| NETWORK | 75 |

| SERVER APPARATUS NAME | CPU POWER (GHz) | MEMORY SIZE (GB) | HOST-BUS ADAPTER CAPACITY (GB/S) | NETWORK CAPACITY (Gb/S) |
|---|---|---|---|---|
| SERVER1 | — | — | — | — |
| SERVER2 | 24 | 10 | 0.4 | 2 |
| SERVER3 | 24 | 16 | 0.6 | 5 |
| SERVER4 | 16 | 2 | 0.4 | 1 | ns
MANAGEMENT APPARATUS, METHOD, AND PRIVILEGED AND CONFIDENTIAL MEDIUM STORING PROGRAM TO MIGRATE A VIRTUAL MACHINE WHEN A RESOURCE SHORTAGE OR BOOTING OCCURS

CROSS-REFERENCE TO RELATED APPLICATIONS

This application is based upon and claims the benefit of priority of the prior Japanese Patent Application No. 2010-61849, filed on Mar. 18, 2010, the entire contents of which are incorporated herein by reference.

BACKGROUND

1. Field

The embodiments disclosed herein are related to a technique of managing a virtual computer system.

2. Description of the Related Art

In recent years, virtual computer systems have widely been in practical use. In the virtual computer system, a plurality of virtual machines is constructed on a server apparatus, and any OS (Operating System) and applications run on each of the virtual machines. A dynamic scheduling function is incorporated in the virtual computer system in order to respond to load fluctuations flexibly. With the dynamic scheduling function, resource allocation to the virtual machines is dynamically carried out on the basis of resource usage rates of CPUs (Central Processing Units), memories, disks, networks, etc., of the virtual machines.

However, in a related-art dynamic scheduling function, only one server apparatus has been targeted to be managed. Thus, in a virtual computer system including a plurality of server apparatuses, when a resource bottleneck occurs in a server apparatus, it has not been possible to solve the bottleneck.

SUMMARY

According to an aspect of the invention, an apparatus includes a first requesting unit, when a resource shortage or booting of a virtual machine occurs in a first server apparatus of the server apparatus, requesting each of the other server apparatuses to report a resource usage rate to obtain one or more resource usage rates; a selection unit selecting a second server apparatus having a surplus resource from the other server apparatuses on the basis of the obtained one or more resource usage rates; and a second requesting unit requesting the first server apparatus to perform a live migration to migrate a virtual machine running on the first server apparatus to the second server apparatus.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 3 illustrates a capacity information table.

FIG. 8 illustrates resource-usage-rate information.

FIG. 14 illustrates an explanatory diagram of resource shortage information.

FIG. 16A, FIG. 16B, FIG. 16C, and FIG. 16D illustrate examples of resource-usage-rate information of servers 1 to 4, respectively, which are individually informed at the time of starting a guest OS.

FIG. 17 illustrates a resource free state in each server apparatus.

FIG. 18A, FIG. 18B, and FIG. 18C illustrate examples of resource-usage-rate information of servers 2 to 4, respectively, which are individually informed at the time of the occurrence of a resource shortage.

FIG. 19 illustrates a resource free state in each server apparatus.

DETAILED DESCRIPTION OF THE PREFERRED EMBODIMENTS

Figure 1:
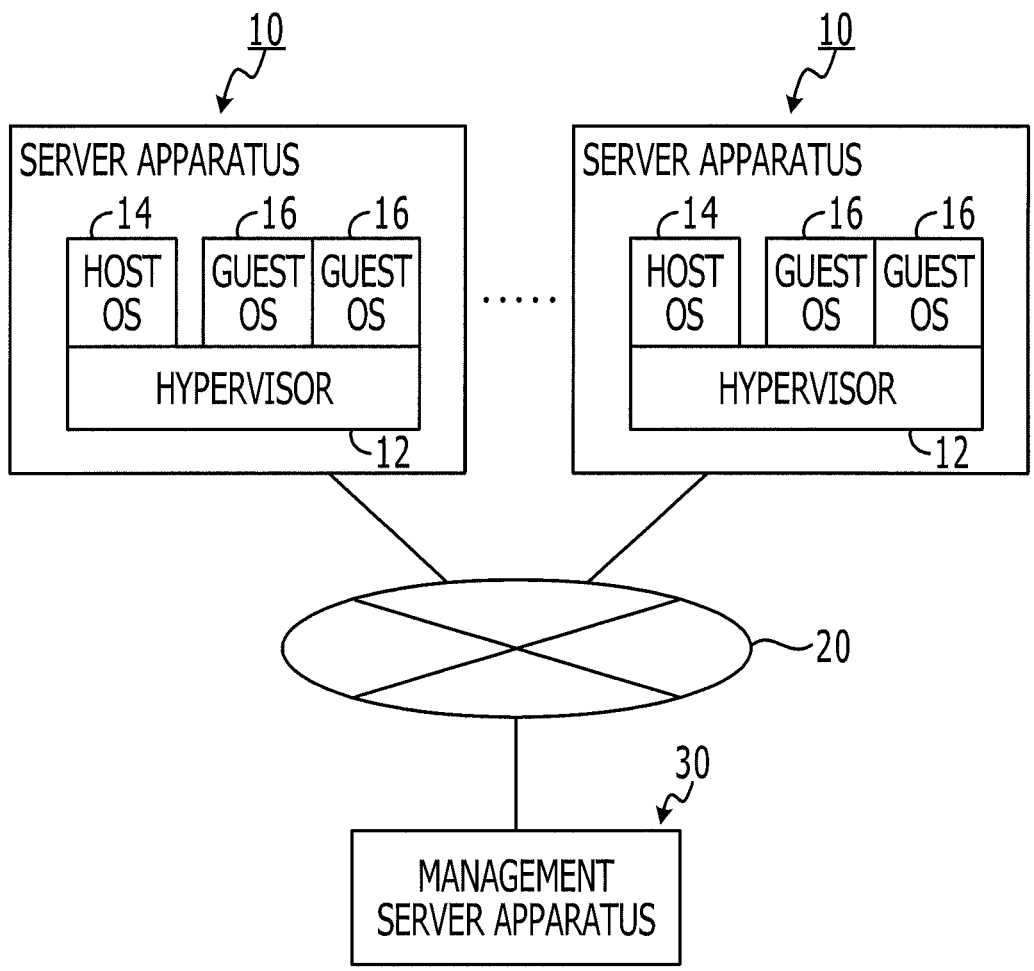
FIG. 1 illustrates an overall configuration of a virtual computer system to which this technique is applied.

Reference may now be made in detail to embodiments of the present invention, examples of which are illustrated in the accompanying drawings, wherein like reference numerals refer to like elements throughout.

In the following, a detailed description will be given of a technique on embodiments for implementing the present invention with reference to appended drawings.

FIG. 1 illustrates an overall configuration of a virtual computer system according to the present embodiment.

A plurality of server apparatuses 10 to be managed are connected to a management server apparatus (a general-purpose computer can be used) 30 through a network 20, such as the Internet, etc. A hypervisor (program) 12 which allows a plurality of different OSs to run in parallel by achieving a virtual machine, which is a virtual computer, using software is implemented In the server apparatus 10. The hypervisor 12 individually manages a host OS 14 to be a basis on which programs of a virtual machine run, and guest OSs 16 running on the virtual machine. Here, the server apparatus 10 and the management server apparatus 30 individually have a processor, such as a CPU (Central Processing Unit), etc., and a storage device, such as a memory, etc.

Figure 2:
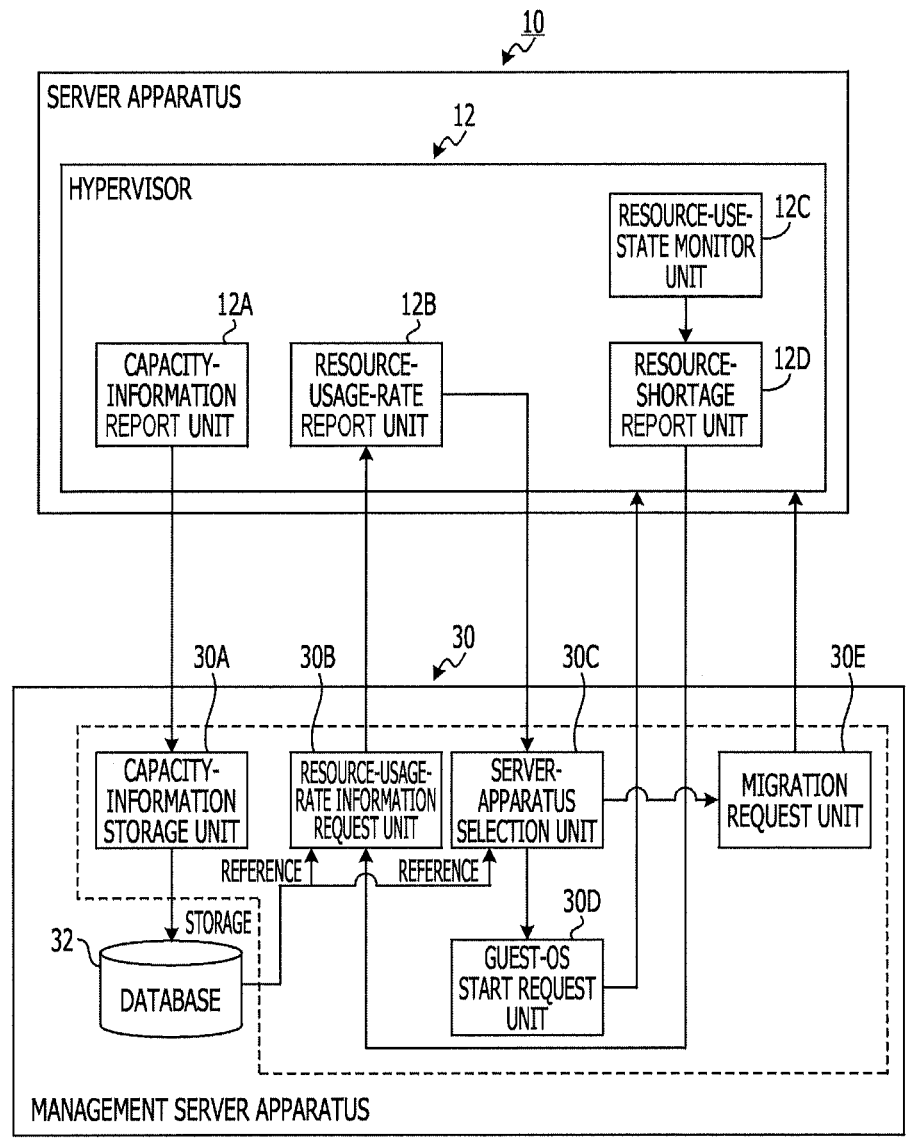
FIG. 2 illustrates functional blocks of a server apparatus and a management server apparatus.

As shown in FIG. 2, programs for functioning as a capacity-information report unit 12A, a resource-usage-rate report unit 12B, a resource-use-state monitor unit 12C, and a resource-shortage report unit 12D are incorporated in the hypervisor 12 implemented in the server apparatus 10.

The capacity-information report unit 12A is triggered to inform the management server apparatus 30 of resource capacities of the server apparatus 10 by starting the server apparatus 10 or adding resources (a CPU, a memory, a host bus adapter, and a network card, etc.) to the server apparatus 10. Here, the host bus adapter includes devices for connecting a SCSI (Small Computer System Interface), a fiber channel, and a serial ATA (Advanced Technology Attachment), etc. The resource-usage-rate report unit 12B is triggered to return a resource usage rate of the server apparatus 10 to the management server apparatus 30 by reception of an information request from the management server apparatus 30. The resource-use-state monitor unit 12C is triggered to monitor a resource use state all the time by starting the server apparatus 10. The resource-shortage report unit 12D is triggered to inform the management server apparatus 30 of the occurrence of the resource shortage by the resource-use-state monitor unit 12C detecting a resource shortage.

On the other hand, the management server apparatus 30 has a database 32 built on a storage, such as a hard disk, etc. As shown in FIG. 3, the database 32 holds a capacity information table 40 in which CPU power, a memory size, a host-bus adapter capacity, and a network capacity of a server apparatus 10 are related to a server apparatus name for identifying the server apparatus 10. The CPU power is the product of an operating frequency of a processor core and the number of the cores. For example, if 16 pieces of processor cores having 2.4 GHz, the CPU power becomes 2.4×16=38.4 GHz. The memory size indicates the total amount of memory installed on the server apparatus 10. The host-bus adapter capacity is the product of a transfer rate of a host bus adapter and the number of installation. For example, if four pieces of host bus adapters having 0.2 GB/S (Giga Byte per Second) are installed, the host-bus adapter capacity becomes 0.2×4=0.8 GB/S.

The transfer rate of a host bus adapter ought to be obtained by executing disk I/O (Input/Output) for each host bus adapter and measuring a speed, or by referring to a dictionary describing a transfer rate for each type of host bus adapter. The network capacity is the product of a transfer rate of a network card and the number of cards. For example, if eight pieces of network cards having 1 Gb/S (Giga bit per Second) are installed, the network capacity becomes 1×8=8 Gb/S. The transfer rate of a network card ought to be obtained by executing I/O for each network card and measuring a speed, or by referring to a dictionary describing a transfer rate for each type of network card.

Also, the management server apparatus 30 executes a management program of the virtual computer system so that, as shown in FIG. 2, the management server apparatus 30 individually realizes a capacity-information storage unit 30A, a resource-usage-rate information request unit 30B, a server-apparatus selection unit 30C, a guest-OS start request unit 30D, and a migration request unit 30E. In this regard, the management program of the virtual computer system is installed from a computer-readable and non-transitory recording medium, such as a CD-ROM (Compact Disk Read Only Memory), etc., to the storage of the management server apparatus 30 using a publicly known means.

The capacity-information storage unit 30A is triggered to store the resource capacity of the server 10 into the database 32 by having been informed of the resource capacity of the server apparatus 10. The resource-usage-rate information request unit 30B is triggered to request the server apparatus 10 to report a resource usage rate by that a start operation of a guest OS 16 has been performed in the management server apparatus 30, or by that the occurrence of a resource shortage has been informed from the server apparatus 10. The server-apparatus selection unit 30C is triggered to select a server apparatus 10 having surplus resources by having been informed of the resource usage rate from the server apparatus 10. The guest-OS start request unit 30D requests the server apparatus 10 selected by the server-apparatus selection unit 30C to start the guest OS 16. The migration request unit 30E requests the server apparatus 10 having encountered a resource shortage and the server apparatus 10 selected by the server-apparatus selection unit 30C to perform live migration of one of the guest OSs 16 from the server apparatus 10 having encountered the resource shortage.

Figure 4:
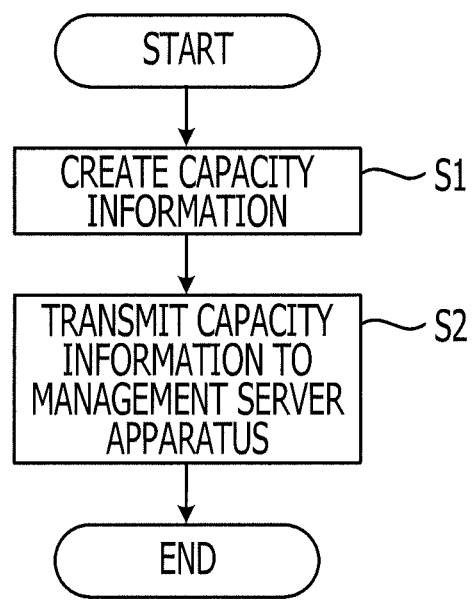
FIG. 4 illustrates a flowchart of capacity-information report processing.

FIG. 4 illustrates an example of capacity-information report processing performed by the capacity-information report unit 12A of the server apparatus 10, which is triggered by the start of the server apparatus 10 or addition of a resource to the server apparatus 10.

Figure 5:
FIG. 5 illustrates capacity information.

In S1 (in the figure, abbreviated as "S1". This is the same in the following.), the capacity-information report unit 12A obtains or measures a CPU power, a memory size, a host-bus adapter capacity, of a network capacity, and creates capacity information 42 shown in FIG. 5. Here, the capacity information 42 includes the CPU power, the memory size, the host-bus adapter capacity, and the network capacity of the server apparatus 10.

In S2, the capacity-information report unit 12A transmits the capacity information 42 with a server apparatus name added to the capacity-information storage unit 30A of the management server apparatus 30.

Figure 6:
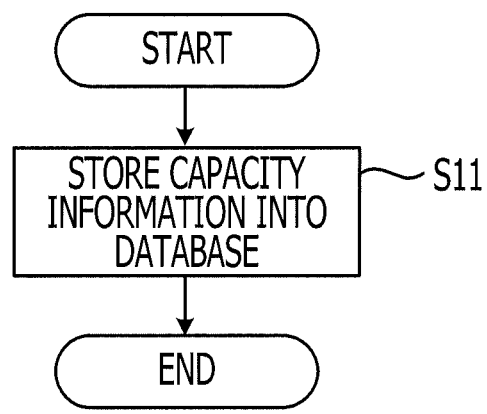
FIG. 6 illustrates a flowchart of capacity-information storage processing.

FIG. 6 illustrates an example of the capacity-information storage processing executed by the capacity-information storage unit 30A of the management server apparatus 30, which is triggered by reception of the capacity information 42.

In S11, the capacity-information storage unit 30A stores capacity information on a record identified by the server apparatus name added to the capacity information 42 in the capacity information table 40 of the database 32.

By such capacity-information report processing and capacity-information storage processing, when the server apparatus 10 is started, or a resource is added to the server apparatus 10, a latest capacity of the server apparatus 10 to be managed is stored in the capacity information table 40 of the database 32 in the server apparatus 30. Accordingly, the management server apparatus 30 can grasp a resource capacity of each server apparatus 10 by referring to the capacity information table 40 of the database 32. In this regard, the capacity information table 40 of the database 32 may be, for example, suitably updated by an administrator of the management server apparatus 30, etc., manually.

Figure 7:
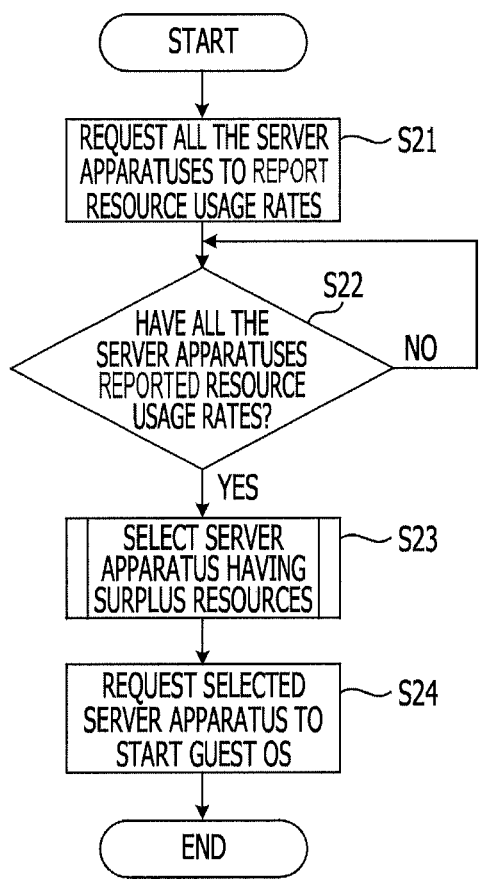
FIG. 7 illustrates a flowchart of a main routine of guest-OS start processing.

FIG. 7 illustrates an example of guest-OS start processing executed in cooperation with the resource-usage-rate information request unit 30B, the server-apparatus selection unit 30C, and the guest-OS start request unit 30D of the management server apparatus 30, which is triggered by a start operation of the guest OS 16 in the management server apparatus 30.

In S21, the resource-usage-rate information request unit 30B refers to the capacity information table 40 in the database 32, and requests all the server apparatuses 10 to be managed to inform resource usage rates.

In S22, the server-apparatus selection unit 30C determines whether the resource usage rates have been informed from all the server apparatuses 10. Here, as shown in FIG. 8, informing the resource usage rates is carried out by the resource-usage-rate information 44 in which usage rates of a CPU, a memory, a host bus adapter, and a network of the server apparatus 10 are set. Also, the resource usage rates informed from each of the server apparatuses 10 are stored in a high-speed storage device, such as a memory, etc., for example, in association with the server apparatus names. And if the server-apparatus selection unit 30C determines that the resource usage rates have been informed from all the server apparatuses 10, the processing proceeds to S23 (Yes). Whereas if the server-apparatus selection unit 30C determines that the resource usage rates have not been informed from all the server apparatuses 10, the processing waits (No).

In S23, the server-apparatus selection unit 30C performs a subroutine selecting a server apparatus 10 having surplus resources.

In S24, the guest-OS start request unit 30D requests the server apparatus 10 selected by the server-apparatus selection unit 30C to start the guest OS 16 of which a start operation is performed.

Figure 9:
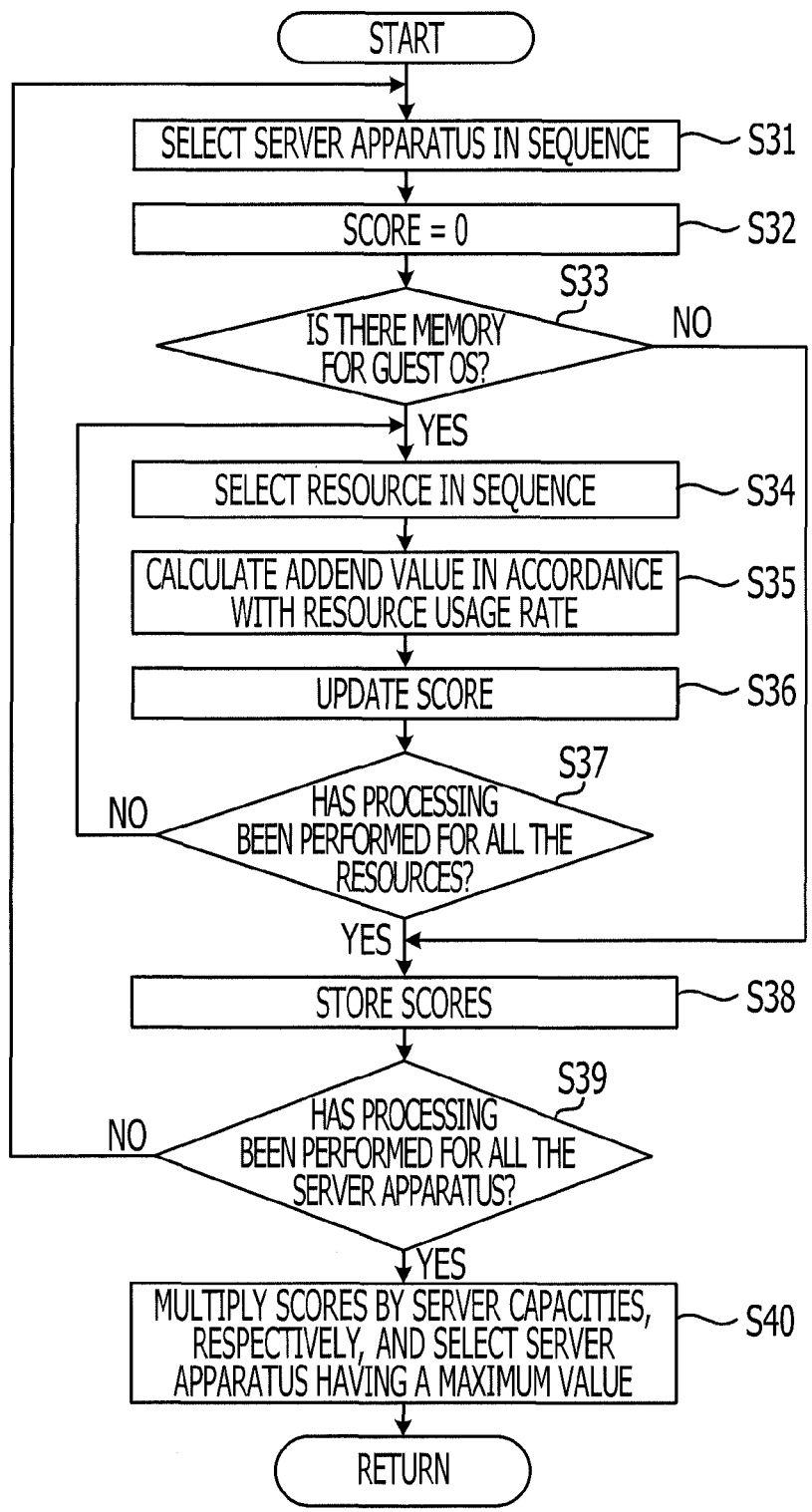
FIG. 9 illustrates a flowchart of a subroutine selecting a server apparatus having surplus resources.

FIG. 9 illustrates an example of a subroutine executed by the server-apparatus selection unit 30C of the management server apparatus 30, that is to say, a subroutine selecting a server apparatus 10 having surplus resources.

In S31, the server-apparatus selection unit 30C refers to the capacity information table 40 in the database 32, and selects a server apparatus 10 to be selection targets in sequence.

In S32, the server-apparatus selection unit 30C resets the score indicating resource surplus in the server apparatus 10 to 0.

In S33, the server-apparatus selection unit 30C determines whether the server apparatus 10 selected in S31 has a sufficient memory for starting the guest OS 16 or not, that is to say, whether there is a free space in the memory. And if the server-apparatus selection unit 30C determines that there is a free space in the memory, the processing proceeds to S34 (Yes). Whereas if determined that there is no free space in the memory, the processing proceeds to S38 (No). In this regard, in the processing corresponding to a resource shortage described below, the guest OS 16 is undetermined, and thus a memory for starting the guest OS 16 ought to be 0.

In S34, the server-apparatus selection unit 30C selects, in sequence, a resource from a CPU, a host bus adapter, and a network.

In S35, the server-apparatus selection unit 30C calculates an addend value in accordance with the resource usage rate of the resource selected in S34 by the following method.

Figure 10:
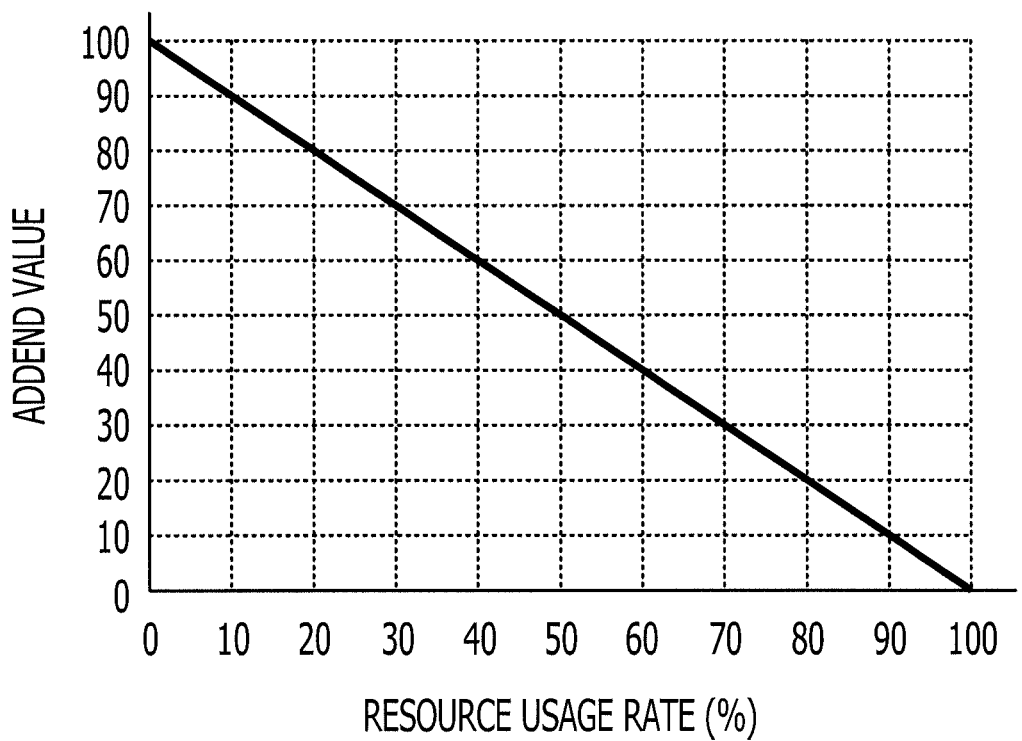
FIG. 10 illustrates a calculation example1 of an addend value for calculating a score.

FIG. 10 illustrates an example of calculating addend value. As shown in FIG. 10, the server-apparatus selection unit 30C refers to a map having a characteristic in which an addend value decreases linearly with increasing resource usage rate to calculate an addend value in accordance with the resource usage rate. In the map shown in the figure, in the case where the resource usage rate is 20%, 50%, 80%, 90%, and 100%, the server-apparatus selection unit 30C calculates that the addend value is 80, 50, 20, 10, and 0, respectively. In this regard, it is possible to express "addend value=initial value−conversion coefficient×resource usage rate", and thus the server-apparatus selection unit 30C may calculate the addend value from the expression.

Figure 11:
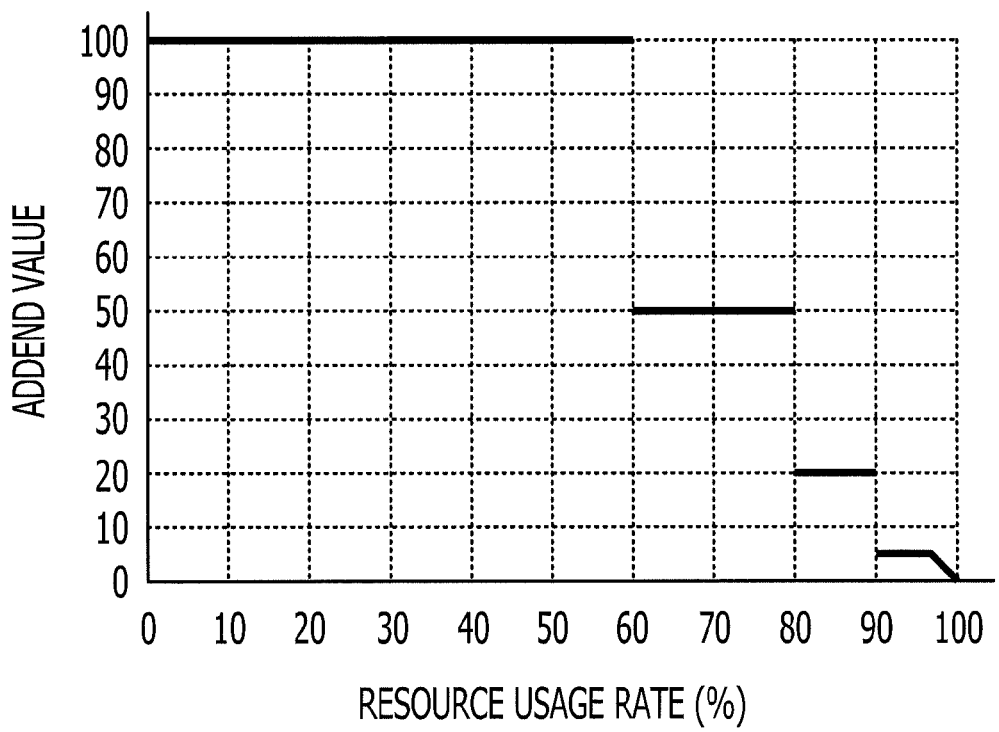
FIG. 11 illustrates a calculation example2 of an addend value for calculating a score.

FIG. 11 illustrates another example of calculating addend value. As shown in FIG. 11, the server-apparatus selection unit 30C refers to a map having a characteristic in which an addend value decreases discretely with increasing resource usage rate to calculate an addend value in accordance with the resource usage rate. In the map shown in the figure, in the case where the resource usage rate is not more than 60%, 61% to 80%, 81% to 90%, 91% to 99%, and 100%, the server-apparatus selection unit 30C calculates the addend value is 100, 50, 20, 5, and 0, respectively. In this manner, if there is a sufficient surplus resource, a large addend value is adopted, and thus a server apparatus 10 having surplus resources becomes easy to be selected. In this regard, the server-apparatus selection unit 30C may calculate the addend value by determination processing by software. Also, the addend value in accordance with the resource usage rate may be freely set by an administrator of the virtual computer system, etc.

In S36, the server-apparatus selection unit 30C adds an addend value to a score so as to update the score (score=score+addend value).

In S37, the server-apparatus selection unit 30C determines whether the score update processing has been performed for all the resources, namely, a CPU, a host bus adapter, and a network. And if the server-apparatus selection unit 30C determines that the score update processing has been performed for all the resources, the processing proceeds to S38 (Yes), whereas if the server-apparatus selection unit 30C determines that the score update processing has not been performed for all the resources, the processing returns to S34 (No).

In S38, the server-apparatus selection unit 30C stores the scores in association with server apparatus names in a high-speed recording apparatus, such as a memory, etc.

In S39, the server-apparatus selection unit 30C determines whether the score calculation processing has been performed for all the server apparatuses 10 stored in the capacity information table 40 of the database 32. And if the server-apparatus selection unit 30C determines that the score calculation processing has been performed for all the server apparatuses 10, the processing proceeds to S40 (Yes). Whereas if the server-apparatus selection unit 30C determines that the score calculation processing has not been performed for all the server apparatuses 10, the processing returns to S31 (No).

In S40, the server-apparatus selection unit 30C selects a server apparatus having a surplus resource. In an embodiment, the server apparatus selection unit may refer to the scores stored in the capacity information table 40 of the database 32 and the storage device, and selects a server apparatus 10 having the largest surplus resource. For example, the server-apparatus selection unit 30C may calculate the product of a capacity of the resources, such as a CPU, a host bus adapter, and a network, for each server apparatus 10 and the score, and selects a server apparatus 10 having a maximum value, wherein a memory resource may be excluded from the capacity of the resources.

Figure 12:
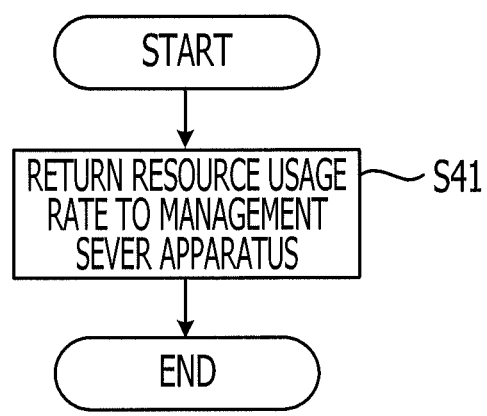
FIG. 12 illustrates a flowchart of resource-usage-rate report processing.

FIG. 12 illustrates an example of resource-usage-rate report processing performed by the resource-usage-rate report unit 12B of the server apparatus 10, which is triggered by reception of an information request of a resource usage rate.

In S41, the resource-usage-rate report unit 12B obtains a use state of each resource of the server apparatus 10, and returns the resource-usage-rate information 44 shown in FIG. 8 to the management server apparatus 30. Here, the resource-usage-rate report unit 12B returns the resource-usage-rate information 44 with a server apparatus name for identifying the server apparatus 10 added.

By such guest-OS start processing and resource-usage-rate report processing, when a start operation of the guest OS 16 is performed in the management server apparatus 30, the resource usage rate of each server apparatus 10 to be managed is inquired. And a server apparatus 10 having a maximum surplus resource is requested to start the guest OS 16. At this time, a server apparatus 10 that starts a guest OS 16 is selected in consideration of not only a CPU power and a memory size, but also a host-bus adapter capacity and a network capacity, in which a bottleneck is apt to occur by IO. Accordingly, it is possible to arrange virtual machines such that a bottleneck hardly occurs in the server apparatus 10.

Figure 13:
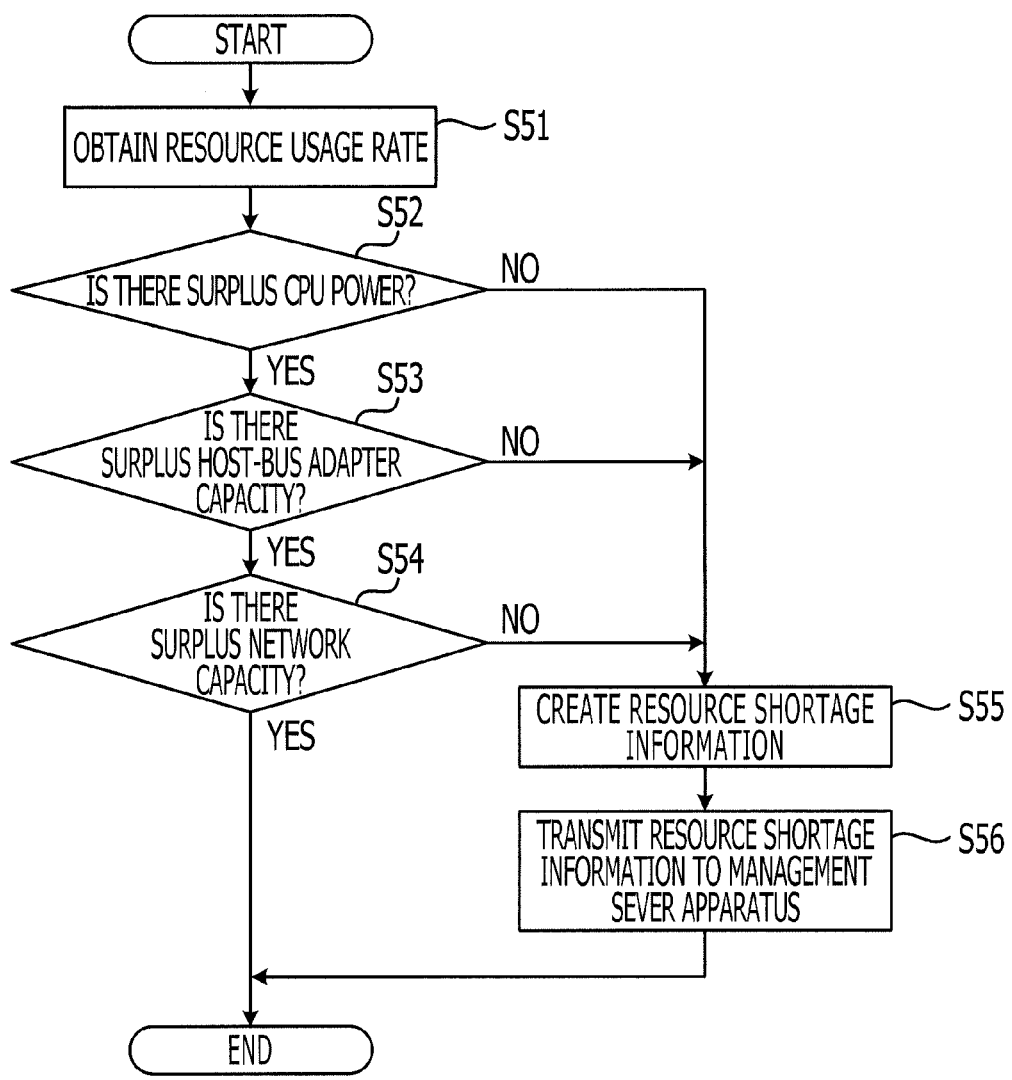
FIG. 13 illustrates a flowchart of resource-shortage report processing.

FIG. 13 illustrates an example of resource-shortage report processing performed repeatedly in cooperation with the resource-use-state monitor unit 12C and the resource-shortage report unit 12D of the server apparatus 10, which is triggered by starting the server apparatus 10.

In S51, the resource-use-state monitor unit 12C obtains the resource usage rate of the server apparatus 10.

In S52, the resource-use-state monitor unit 12C determines whether there is a surplus power in the CPU through a determination of whether the CPU usage rate is a first threshold value or higher. Here, for the first threshold value, for example, it is possible to adopt a value of the CPU having no surplus power 100%, a value of having a little surplus 80%, etc. And if the resource-use-state monitor unit 12C determines that the CPU has surplus power, the processing proceeds to S53 (Yes), whereas if the CPU has no surplus power, the processing proceeds to S55 (No).

In S53, the resource-use-state monitor unit 12C determines whether a host bus adapter has a surplus capacity or not through a determination of whether a host-bus adapter usage rate is a second threshold value or higher. Here, for the second threshold value, for example, it is possible to adopt a value of the host bus adapter having no surplus power 100%, a value of having a little surplus 80%, etc. In this regard, for the second threshold value, a different value from the first threshold value may be adopted in consideration of the characteristic of the host bus adapter (the same for the following). And if the resource-use-state monitor unit 12C determines that the host bus adapter has a surplus capacity, the processing proceeds to S54 (Yes), whereas if the resource-use-state monitor unit 12C determines that host bus adapter has no surplus capacity, processing proceeds to S55 (No).

In S54, the resource-use-state monitor unit 12C determines whether there is a surplus network capacity through a determination of whether the network usage rate is a third threshold value or higher. Here, as the third threshold value, it is possible to adopt a value of the network having no surplus power 100%, a value of having a little surplus 80%, etc. And if the resource-use-state monitor unit 12C determines that there is a surplus network capacity, the processing is terminated (Yes), whereas if the resource-use-state monitor unit 12C determines that there is no surplus network capacity, the processing proceeds to S55 (No).

In S55, the resource-shortage report unit 12D creates resource shortage information 46 as shown in FIG. 14. The resource shortage information 46 holds a record in which a CPU usage rate, a memory usage rate, a host-bus adapter usage rate, and a network usage rate are related to an OS name for identifying each OS having started in the server apparatus 10. In this regard, the resource shortage information 46 shown in FIG. 14 indicates that the network usage rate of the host OS 14 on which the virtual machine program runs has become 100%.

In S56, the resource-shortage report unit 12D transmits the resource shortage information 46 to the management server apparatus 30. In this regard, a server apparatus name is added to the resource shortage information 46 in order to allow identification of which server apparatus 10 the information is provided for.

Figure 15:
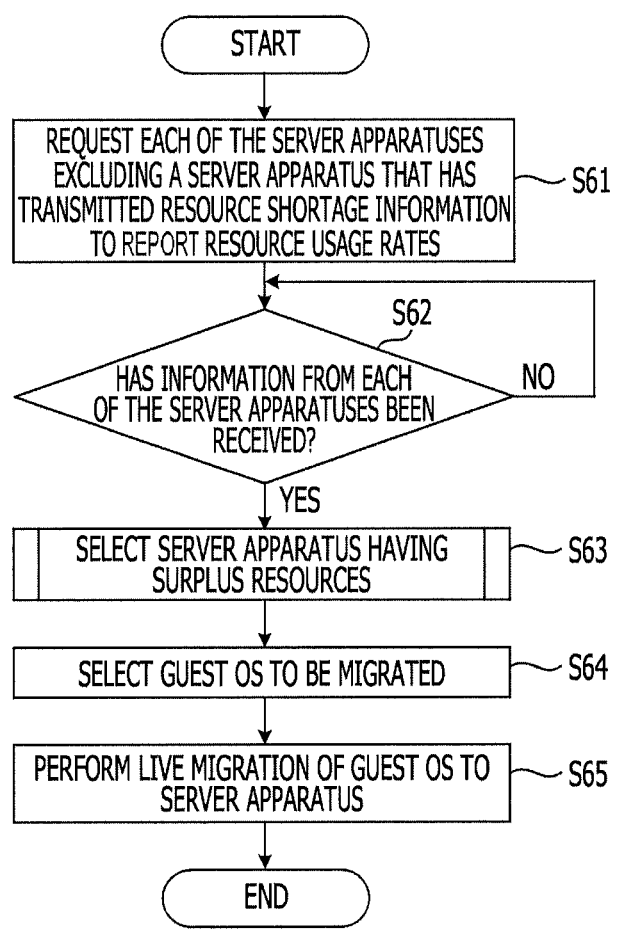
FIG. 15 illustrates a flowchart of migration processing.

FIG. 15 illustrates an example of migration processing performed in cooperation with the resource-usage-rate information request unit 30B, the server-apparatus selection unit 30C, and the migration request unit 30E of the management server apparatus 30, which is triggered by reception of the resource shortage information 46.

In S61, the resource-usage-rate information request unit 30B refers to the capacity information table 40 in the database 32, and requests the other server apparatuses 10 than the server apparatus 10 having transmitted the resource shortage information 46 to report resource usage rates.

In S62, the server-apparatus selection unit 30C determines whether each server apparatus 10 has informed a resource usage rate or not. And if the server-apparatus selection unit 30C determines that each server apparatus 10 has informed the resource usage rate, the processing proceeds to S63 (Yes), whereas if the server-apparatus selection unit 30C determines that each server apparatus 10 has not informed the resource usage rate, the processing waits (No).

In S63, the server-apparatus selection unit 30C performs the subroutine (refer to FIG. 9) selecting a server apparatus 10 having surplus resources.

In S64, the migration request unit 30E selects a guest OS 16 to be subjected to live migration from the server apparatus 10 having transmitted the resource shortage information 46. That is to say, the migration request unit 30E determines in sequence whether a guest OS 16 can be migrated or not to the server apparatus 10 selected in S63 in the descending order of the resource usage rate of the guest OS 16 having encountered a resource shortage. And the migration request unit 30E selects a guest OS 16 determined to be migrated to the server apparatus 10 first. In this regard, if there is no guest OS 16 that can be migrated to the server apparatus 10, the migration request unit 30E determines not to perform live migration.

In S65, the migration request unit 30E performs live migration of the guest OS 16 selected in S64 to the server apparatus 10 selected in S63. That is to say, the migration request unit 30E requests the server apparatus 10 that has transmitted the resource shortage information 46 and the server apparatus 10 selected in S63 to perform live migration of the guest OS 16 selected in S64.

By such resource-shortage report processing and migration processing, if a resource shortage occurs in the server apparatus 10, a guest OS 16 having a high resource usage rate and having encountered a resource shortage is subjected to live migration to a server apparatus 10 having surplus resources. Accordingly, if a resource shortage occurs dynamically in the course of operation of the server apparatus 10, the guest OS 16 is automatically relocated, and thus it is possible to solve a bottleneck that has occurred in the server apparatus 10.

Here, a description will be given of an embodiment on the assumption of a specific case in order to give easy understanding of a management technique of a virtual computer system according to the present embodiment.

It is assumed that the capacity information table 40 shown in FIG. 3 is held in the database 32 of the management server apparatus 30 as the assumption of the embodiments. Also, it is assumed that calculation example2 (FIG. 11) of the addend value for calculating the score is employed. In this regard, the same assumption will be applied to the other embodiments.

In the management server apparatus 30, if a start operation of a guest OS 16 that requires a memory 4 GB is carried out, the management server apparatus 30 inquires a resource usage rate of each server apparatus 10. As a response to the inquiry, each server apparatus 10 returns the resource-usage-rate information 44 as shown in FIGS. 16A to 16D to the management server apparatus 30. And the capacity information table 40 in the database 32 is referenced, and surplus resources as calculated back from the resource usage rate of each server apparatus 10, resulting as shown in FIG. 17.

Next, for each of the server apparatuses 10 having a free space memory capable of starting a guest OS 16, a score corresponding to a resource usage rate is calculated as follows. That is to say, for Server1, the map shown in FIG. 11 is referenced, and as addend values corresponding to a CPU usage rate 50%, a host-bus adapter usage rate 88%, and a network usage rate 38%, 100, 20, and 100 are obtained, respectively. And by accumulating each addend value corresponding to the CPU usage rate, the host-bus adapter usage rate, and the network usage rate, the score is calculated to be 220. The same processing is performed for Server2 to Server4, and the scores are calculated to be 170, 170, and 0, respectively. Here, for Server4, a free space of the memory is 2 GB so that the guest OS 16 cannot be started, and thus the score is calculated to be 0 regardless of free states of the other resources. A server apparatus not having a sufficient free space ought to be excluded from the selection target.

After that, for each server apparatus 10, the accumulated value of the product value of a CPU power, a host-bus adapter capacity, and a network capacity and scores, respectively are calculated as follows.

| | |
|---|---|
| 40×220+0.8×220+8×220=10736 | Server1 |
| 32×170+1.2×170+16×170=8346 | Server2 |
| 60×170+1.6×170+24×170=14552 | Server3 |
| 24×0+0.6×0+4×0=0 | Server4 |

And Server3, which has a maximum accumulated value, is selected, and Server3 is requested to start the guest OS 16.

When a resource shortage occurs in Server1, Server1 informs the management server apparatus 30 of the resource shortage information 46 shown in FIG. 14. The management server apparatus 30 that has received the resource shortage information 46 inquires a resource usage rate of Server2 to Server4 excluding Server1 having encountered the resource shortage. As responses to the inquiries, Server2 to Server4 return resource-usage-rate information 44 as shown in FIGS. 18A to 18C to the management server apparatus 30. And the capacity information table 40 in the database 32 is referenced, and surplus resources are calculated back from the resource usage rate of each server apparatus 10, resulting as shown in FIG. 19. Here, Server1 has encountered a resource shortage, and thus Server1 is excluded from the target of live migration of the guest OS 16.

Next, for Server2 to Server4, a score corresponding to a resource usage rate is calculated as follows. That is to say, for Server2, the map shown in FIG. 11 is referenced, and as addend values corresponding to a CPU usage rate 50%, a host-bus adapter usage rate 67%, and a network usage rate 88%, 100, 50, and 20 are obtained, respectively. And by accumulating each addend value corresponding to the CPU usage rate, the host-bus adapter usage rate, and the network usage rate, the score is calculated to be 170. The same processing is performed for Server3 and Server4, and the scores are calculated to be 200, and 250, respectively.

After that, for Server2 to Server4, the accumulated value of the product value of a CPU power, a host-bus adapter capacity, and a network capacity and scores, respectively are calculated as follows.

| | |
|---|---|
| 32×170+1.2×170+16×170=8346 | Server2 |
| 60×200+1.6×200+24×200=17120 | Server3 |
| 24×250+0.6×250+4×250=7150 | Server4 |

And Server3, which has a maximum accumulated value, is selected.

Also, for a network in Server1, Guest1 is selected as a guest OS 16 having a maximum network usage rate. The memory usage rate of Guest1 is 20%, and thus a memory required to start Guest1 is obtained as 12.8 GB (64 GB×0.2). A free space of the memory of Server3 is 16 GB so that Guest1 can be started, and thus the guest OS 16 to be live migrated to Server3 is determined to be Guest1.

After that, a request is made to Server1 and Server3 to live-migrate Guest1 of Server1 to Server3.

This is the same as the case of starting a guest OS, and thus the description thereof should be referenced.

By above-described embodiments, in a virtual computer system including a plurality of server apparatuses on which virtual machines run, even if a resource bottleneck occurs in a certain server apparatus, it is possible to solve the bottleneck.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-readable, non-transitory medium storing a management program for causing a management server apparatus to execute a procedure, the management server apparatus managing a plurality of server apparatuses, the procedure comprising:
   providing the management server apparatus with capacity information that stores, in association with each of the plurality of server apparatuses, capacity values of resources of the each server apparatus;
   when a resource shortage or booting of a virtual machine occurs in a first server apparatus of the plurality of server apparatuses, requesting each of other server apparatuses of the plurality of server apparatuses to report a resource usage rate to obtain one or more resource usage rates;
   calculating, for each of the other server apparatuses, a score indicating resource surplus in the each server apparatus, based on the capacity information and the obtained one or more resource usage rates, to obtain a product sum by summing up products of the calculated score and each of the capacity values of the resources of the each server apparatus;
   selecting, from among the other server apparatuses, a second server apparatus for which the obtained product sum is largest among the other server apparatuses; and
   requesting the first server apparatus to perform a live migration to migrate the virtual machine running on the first server apparatus to the second server apparatus.

2. The medium according to claim 1, wherein the selecting selects a server apparatus from the plurality of server apparatuses as the second server apparatus when each of the other server apparatuses including the server apparatus has a surplus resource, a usage rate of the server apparatus is the lowest among usage rates of the other server apparatuses and a resource ability value of the server apparatus is the highest among resource ability values of the other server apparatuses.

3. The medium according to claim 1, wherein the procedure further comprises:
   requesting each of the other server apparatuses to report the resource usage rate when new resources are added.

4. The medium according to claim 3, wherein the new resources are selected from the group consisting of:
   a CPU,
   a memory,
   a host bus adapter, and
   a network card.

5. The medium according to claim 1, wherein the procedure further comprises:
   determining whether the second server apparatus has sufficient resources for starting a guest operating system.

6. The medium according to claim 5, wherein the sufficient resources are selected from the group consisting of:
   CPU,
   a memory,
   a host bus adapter, and
   a network card.

7. The medium according to claim 1, wherein whether a resource shortage occurs depends on whether the selected server has sufficient memory to start the virtual machine, or whether there is free space in the memory.

8. A management apparatus for managing a plurality of server apparatuses, the management apparatus comprising:
   a memory configured to store capacity information that stores, in association with each of the plurality of server apparatuses, capacity values of resources of the each server apparatus; and
   a processor configured to:
   when a resource shortage or booting of a virtual machine occurs in a first server apparatus of the plurality of server apparatuses, request each of other server apparatuses to report a resource usage rate to obtain one or more resource usage rates;
   calculate, for each of the other server apparatuses, a score indicating resource surplus in the each server apparatus, based on the capacity information and the obtained one or more resource usage rates, to obtain a product sum by summing up products of the calculated score and each of the capacity values of the resources of the each server apparatus;
   select, from among the other server apparatuses, a second server apparatus for which the obtained product sum is largest among the other server apparatuses; and
   request the first server apparatus to perform a live migration to migrate the virtual machine running on the first server apparatus to the second server apparatus.

9. The management apparatus according to claim 8, wherein whether a resource shortage occurs depends on whether the selected server has sufficient memory to start the virtual machine, or whether there is free space in the memory.

10. A method for a migration of a virtual machine among a plurality of server apparatuses, the method comprising:
    providing capacity information that stores, in association with each of the plurality of server apparatuses, capacity values of resources of the each server apparatus;
    when a resource shortage or booting of a virtual machine occurs in a first server apparatus of the plurality of server apparatuses, requesting other server apparatuses of the plurality of server apparatuses to report a resource usage rate to obtain one or more resource usage rates;
    calculating, for each of the other server apparatuses, a score indicating resource surplus in the each server apparatus, based on the capacity information and the obtained one or more resource usage rates, to obtain a product sum by summing up products of the calculated score and each of the capacity values of the resources of the each server apparatus;
    selecting, from among the other server apparatuses, a second server apparatus for which the obtained product sum is largest among the other server apparatuses; and
    requesting the first server apparatus to perform a live migration to migrate the virtual machines running on the first server apparatus to the second server apparatus.

11. The method according to claim 10, wherein whether a resource shortage occurs depends on whether the selected server has sufficient memory to start the virtual machine, or whether there is free space in the memory.

12. A management apparatus for managing a plurality of server apparatuses, the management apparatus comprising:
    a processor to execute a procedure, the procedure comprising:
    providing capacity information that stores, in association with each of the plurality of server apparatuses, capacity values of resources of the each server apparatus;
    when a resource shortage or booting of a virtual machine occurs in a first server apparatus of the plurality of server apparatuses, to requesting each of other server apparatuses to report a resource usage rate to obtain one or more resource usage rates;
    calculating, for each of the other server apparatuses, a score indicating resource surplus in the each server apparatus, based on the capacity information and the obtained one or more resource usage rates, to obtain a product sum by summing up products of the calculated score and each of the capacity values of the resources of the each server apparatus;
    selecting, from among the other server apparatuses, a second server apparatus for which the obtained product sum is largest among the other server apparatuses; and
    requesting the first server apparatus to perform a live migration to migrate the virtual machine running on the first server apparatus to the second server apparatus.

13. The management apparatus according to claim 12, wherein whether a resource shortage occurs depends on whether the selected server has sufficient memory to start the virtual machine, or whether there is free space in the memory.

* * * * *